US008789040B1

(12) United States Patent
Callary

(10) Patent No.: US 8,789,040 B1
(45) Date of Patent: Jul. 22, 2014

(54) CONVERTING NON-NATIVELY EXECUTABLE PROGRAMS TO DOWNLOADABLE EXECUTABLE PROGRAMS

(71) Applicant: Appenity LLC, Irvine, CA (US)

(72) Inventor: Lars Callary, Irvine, CA (US)

(73) Assignee: Appenity LLC, Irvine, CA (US)

(*) Notice: Subject to any disclaimer, the term of this patent is extended or adjusted under 35 U.S.C. 154(b) by 0 days.

(21) Appl. No.: 13/943,488

(22) Filed: Jul. 16, 2013

(51) Int. Cl.
| | |
|---|---|
| G06F 17/00 | (2006.01) |
| G10L 13/00 | (2006.01) |
| G06Q 30/00 | (2012.01) |
| G06F 7/00 | (2006.01) |
| H04L 29/06 | (2006.01) |
| G06F 17/24 | (2006.01) |
| G06F 3/048 | (2013.01) |
| G06F 3/00 | (2006.01) |
| G06F 9/44 | (2006.01) |
| G06F 9/445 | (2006.01) |
| G06F 9/455 | (2006.01) |
| G06F 7/04 | (2006.01) |
| G06F 15/16 | (2006.01) |

(52) U.S. Cl.
CPC ........................................ G06F 8/61 (2013.01)
USPC .......... 717/178; 700/94; 704/258; 705/14.75; 705/14.35; 705/14.43; 705/14.49; 705/14.71; 707/609; 707/707; 713/154; 715/273; 715/738; 715/764; 717/113; 717/116; 717/168; 717/173; 717/174; 718/1; 719/328; 726/4

(58) Field of Classification Search
None
See application file for complete search history.

(56) References Cited

U.S. PATENT DOCUMENTS

| | | | | |
|---|---|---|---|---|
| 7,234,163 | B1* | 6/2007 | Rayes et al. | 713/154 |
| 7,478,047 | B2* | 1/2009 | Loyall et al. | 704/258 |
| 7,788,593 | B1* | 8/2010 | Grechishkin et al. | 717/174 |
| 7,801,847 | B2* | 9/2010 | Kiilerich et al. | 707/609 |
| 8,387,048 | B1* | 2/2013 | Grechishkin et al. | 718/1 |
| 2004/0158813 | A1* | 8/2004 | Xia et al. | 717/116 |
| 2005/0229239 | A1* | 10/2005 | Gray et al. | 726/4 |
| 2006/0150167 | A1* | 7/2006 | Ziegler et al. | 717/143 |
| 2007/0226238 | A1* | 9/2007 | Kiilerich et al. | 707/101 |
| 2008/0082421 | A1* | 4/2008 | Onyon et al. | 705/14 |

(Continued)

*Primary Examiner* — Don Wong
*Assistant Examiner* — Anibal Rivera
(74) *Attorney, Agent, or Firm* — Hickman Palermo Truong Becker Bingham Wong LLP

(57) ABSTRACT

In an embodiment, a data processing method comprises receiving, from a first computer, and storing at a service provider computer, a copy of a non-natively-executable computer program; generating and distributing a download link that is configured, when activated, to cause downloading of a dynamically generated natively executable installer program from the service provider computer; receiving a request based upon the download link, and in response, the service provider computer generating a natively executable installer program that comprises the non-natively-executable computer program file and, optionally a player or other support software and/or one or more bundled external software offers, and providing the installer program to the end user computer; receiving, from the installer program, a request for the non-natively-executable computer program; providing the non-natively-executable computer program from the service provider computer to the end user computer; and the method is performed by one or more computing devices.

28 Claims, 10 Drawing Sheets

(56) References Cited

U.S. PATENT DOCUMENTS

| | | | |
|---|---|---|---|
| 2009/0007092 A1* | 1/2009 | Wolfe | 717/173 |
| 2009/0172657 A1* | 7/2009 | Makelainen et al. | 717/174 |
| 2009/0248524 A1* | 10/2009 | Defoy et al. | 717/168 |
| 2009/0265620 A1* | 10/2009 | Hickman | 715/273 |
| 2010/0094728 A1* | 4/2010 | Denning et al. | 715/738 |
| 2010/0268609 A1* | 10/2010 | Nolet et al. | 705/14.71 |
| 2011/0016004 A1* | 1/2011 | Loyall et al. | 705/14.72 |
| 2011/0040610 A1* | 2/2011 | Araiza-Boys | 705/14.35 |
| 2011/0040690 A1* | 2/2011 | Araiza-Boys | 715/764 |
| 2011/0218857 A1* | 9/2011 | Araiza-Boys | 705/14.49 |
| 2012/0016861 A1* | 1/2012 | Edwards et al. | 707/707 |
| 2012/0130801 A1* | 5/2012 | Baranov et al. | 705/14.43 |
| 2012/0137281 A1* | 5/2012 | Kleiner et al. | 717/174 |
| 2012/0209413 A1* | 8/2012 | Xu et al. | 700/94 |
| 2013/0167162 A1* | 6/2013 | Fernandez | 719/328 |
| 2013/0198714 A1* | 8/2013 | Moody et al. | 717/113 |

* cited by examiner

Fig. 1A
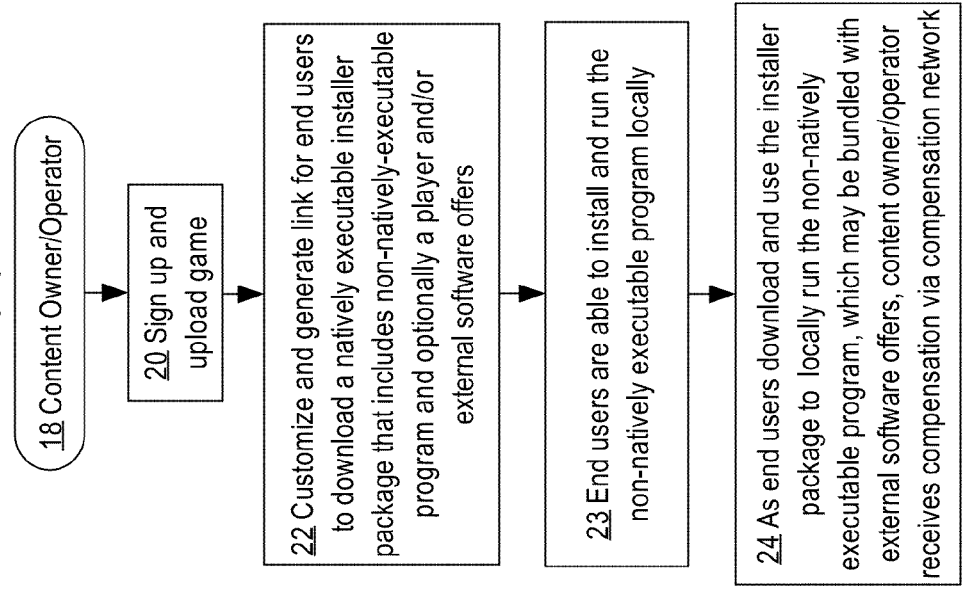
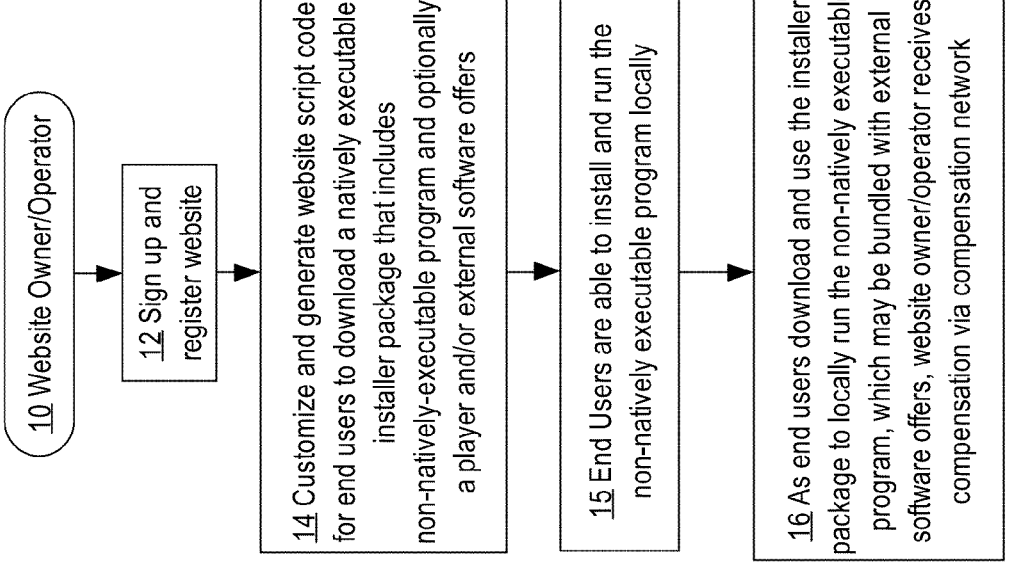

Fig. 6

Add a Game

REQUIRED FIELDS

Game Name *
[ 602 ]

Category *
[ Select Category ▼ ]
603

Version of your game you want downloaded *
[ Choose File ] No file chosen
604

605
Terms of Use *  ○ Use Universal Terms of Use   ○ Use Custom Terms of Use

601

End User License Agreement
606

1. General Information
This End User License Agreement ("EULA") is an agreement between you and dwdw dwwdwd ("dwdw dwwdwd" or "we" or "us" or "our"). By installing or using the downloadable computer game (the "Game"), you signify your agreement to this EULA. If you do not agree to the terms of this EULA, please immediately uninstall the Game or cease your installation of the Game and exit this installation process.

2. Copy of EULA
A copy of this EULA is included with your download of the Game. You should review this EULA each time you use the Game and if at any time you no longer accept the terms of this EULA, please immediately cease your use of the Game and uninstall it.

3. Uninstallation
To uninstall the Game, go to "Uninstall a program" in your Control Panel. Select the Game from the list of programs and then click Uninstall. From thereon, follow the uninstall directions to complete the uninstall process. You can also uninstall the Game by opening the Game file that is included with your download of the Game.

4. Advertisements
The Game may display advertisements from third parties ("Third Party Advertisements") before, after and/or while you play the Game. Your dealings with Third Party Advertisements, including, but not limited to, your participation in its advertisements, promotions, purchase of its goods, or any other type of ☐ By checking this box, I re-confirm, on behalf of myself or the entity, company, organization or institution I represent, that I have read, understood, acknowledged and agreed to be bound by the FlashWrap Distribution Agreement, which is available here for reference.

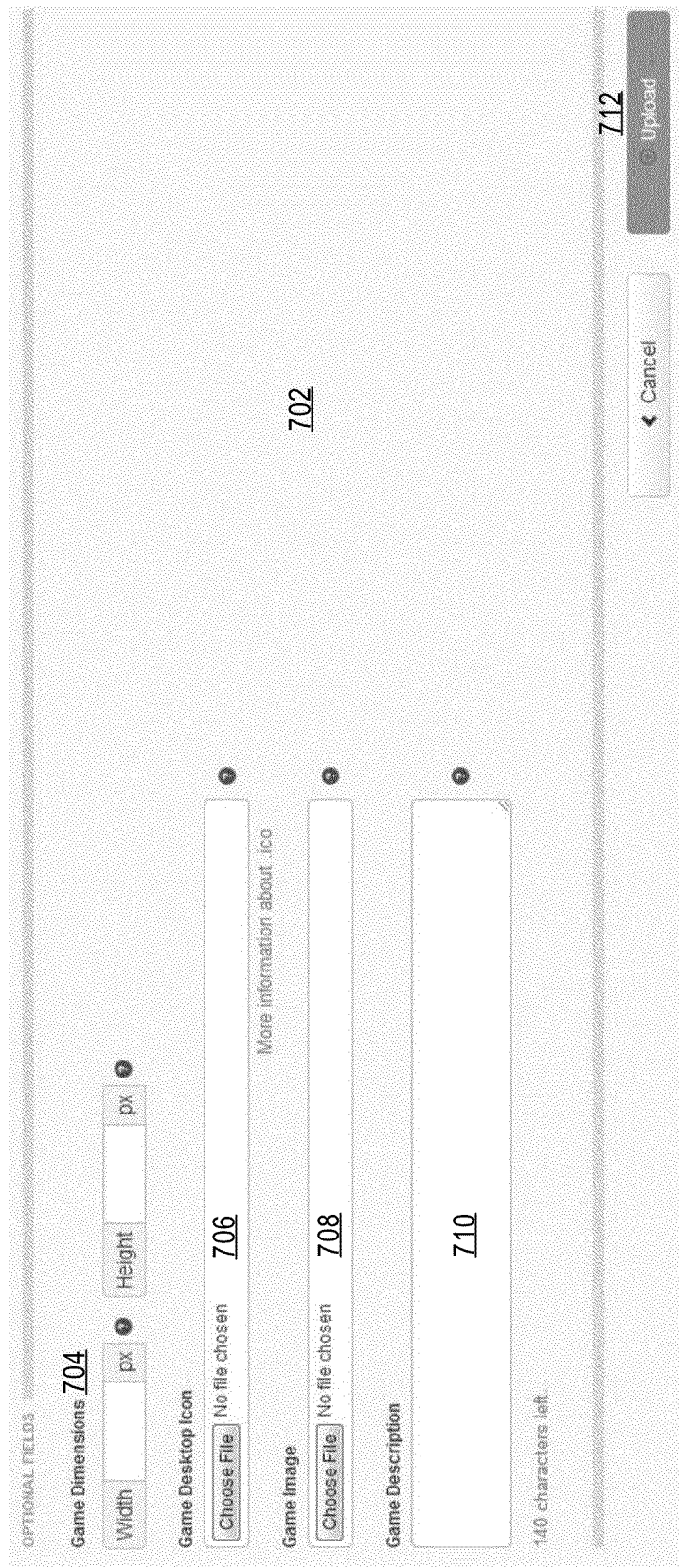

US 8,789,040 B1

CONVERTING NON-NATIVELY EXECUTABLE PROGRAMS TO DOWNLOADABLE EXECUTABLE PROGRAMS

FIELD OF THE DISCLOSURE

The present disclosure generally relates to computer programming. The disclosure relates more specifically to techniques for enabling the execution of computer programs, alone or in combination with bundled external software offers, on target client computer systems that cannot otherwise execute the programs, natively.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Several kinds of programming techniques are commonly used to provide functional capabilities within internet browsers such as GOOGLE CHROME, MOZILLA FIREFOX and MICROSOFT INTERNET EXPLORER. For example, browser-executed code in the JAVASCRIPT language may be received and executed in the browser to provide local functions on a client computer while interacting with a remotely located server computer. As another example, certain browsers can receive and play ADOBE FLASH files to provide functional capabilities such as animation, movies, or games.

However, execution or playback of ADOBE FLASH files or other kinds of programs, languages or browser executable code typically requires streaming program file data from a separate server computer over an available public network connection, such as internet connection to an end user computer, because the programs are not natively executable on the computer; they require a player, browser plug-in, or other support software to run. If an internet connection is unavailable or has insufficient bandwidth, or if the player, plug-in or other support software is not installed, then execution or playback of the programs may be impossible or impractical, so there is a need for a way to provide end users with a way to play the programs without having a live connection or previously installed support software.

Further, website owners/operators or content owners/operators of ADOBE FLASH files or other kinds of programs, languages or browser executable code may wish to develop new revenue streams derived from their work, but may lack the technical skills or business contacts to implement, for example, monetization programs in connection with their work. Thus, there is a need to provide a convenient and simple way for content owners/operators or website owners/operators to integrate monetization techniques into existing ADOBE FLASH files or other kinds of browser executable code, programs or languages.

SUMMARY

The appended claims may serve as a summary of the disclosure.

BRIEF DESCRIPTION OF THE DRAWINGS

In the drawings:

FIG. 1A illustrates processes of packaging browser executable assets with bundled external software offers in two views (A) and (B) appropriate for websites owner/operators and content owner/operators, respectively.

FIG. 6 illustrates a screen display that the service application may generate for receiving data that defines a game, for example.

FIG. 7 illustrates a screen display that the service application may generate for receiving a second set of data that further defines a game, for example.

DETAILED DESCRIPTION

Figure 1B:
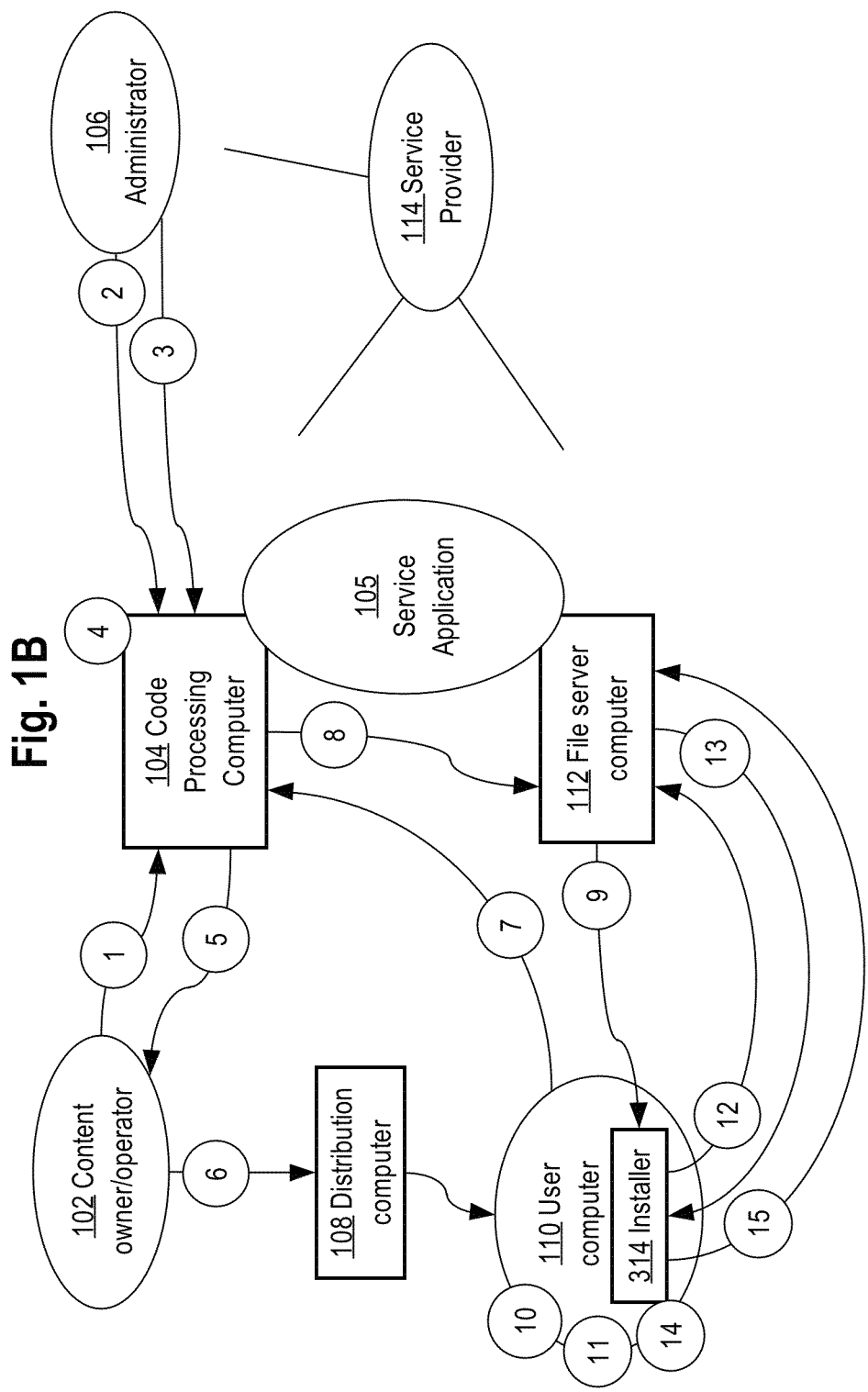
FIG. 1B illustrates a computer system arrangement useful in transforming non-natively-executable programs into natively executable programs and focusing on example operations of a content owner/operator.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In an embodiment, a data processing method comprises receiving, from a first computer, and storing at a service provider computer, a copy of a non-natively-executable computer program file; generating and distributing a download link that is configured, when activated, to cause downloading of a dynamically generated natively executable installer program from the service provider computer; receiving from an end user computer, a request based upon the download link, and in response to the request, the service provider computer generating a natively executable installer program that comprises some or all of the non-natively-executable computer program and one or more bundled external software offers, and providing the installer program to the end user computer; receiving, from the installer program, a request for the non-natively-executable computer program file; providing the non-natively-executable computer program file from the service provider computer to the end user computer; and the method is performed by one or more computing devices.

In one feature, the non-natively-executable computer program file is a FLASH file and the installer program further comprises a FLASH player. In another feature, the installer program further comprises one or more bundled external software offers each of which comprises a network identifier which when invoked causes downloading an advertising-supported program. In another feature, the advertising-supported program is a toolbar.

In yet another feature, generating the installer program comprises selecting, as the one or more bundled external software offers, a subset of offers from among a set of stored offers based upon one or more stored selection criteria.

In another feature, the method further comprises executing the installer program on the end user computer and generating one or more offers to install the one or more bundled external software offers on the end user computer.

In another feature, the request for the non-natively-executable computer program file is formatted to prevent spoofing. In another feature, the non-natively-executable computer program file is a FLASH or SWF file that implements a game. In a further feature, the method further comprises the installer program sending a request for the non-natively-executable computer program file to the service provider computer, in response to determining that the installer program was installed and one or more of the bundled external software offers was selected or installed.

In another feature, the method further comprises the installer program sending a request for the non-natively-executable computer program to the first computer, in response to determining that the installer program was installed and one or more of the bundled external software offers was selected or installed. Selecting or installing one or more of the bundled external software offers is not required in all embodiments, and in some embodiments the end user may decline installing all of the bundled external software offers. In various embodiments, in response to receiving a selection of a download link, the installer program checks which programs are already installed on the end user's computer. In an embodiment, the installer program is configured to confirm which offers were successfully installed.

In an embodiment, a data processing method comprises receiving, from a first computer, and storing at a service provider computer, data identifying a website that is capable of hosting a copy of a non-natively-executable computer program file; generating and providing to the first computer a script code that is configured, when activated, to cause downloading of a dynamically generated natively executable installer program from the service provider computer; receiving from an end user computer, a request based upon the script code, and in response to the request, the service provider computer generating a natively executable installer program that comprises some or all of the non-natively-executable computer program and one or more bundled external software offers, and providing the installer program to the first computer; receiving at the first computer, from the installer program, a request for the non-natively-executable computer program file; providing the non-natively-executable computer program file from the first computer to the end user computer; and the method is performed by one or more computing devices.

In one feature, the non-natively-executable computer program file is a FLASH file and the installer program further comprises a FLASH player. In another feature, the installer program further comprises one or more bundled external software offers each having a network identifier which when invoked causes downloading an advertising-supported program. In yet another feature, the advertising-supported program is a toolbar.

In a further feature, generating the installer program comprises selecting, as the one or more bundled external software offers, a subset of offers from among a set of stored offers based upon one or more stored selection criteria.

In still another feature, the method further comprises executing the installer program on the end user computer and generating one or more offers to install the one or more bundled external software offers on the end user computer.

In another feature, the request for the non-natively-executable computer program file is formatted to prevent spoofing. In another feature, the non-natively-executable computer program file is a FLASH or SWF file that implements a game. In a further feature, the method further comprises the installer program sending a request for the non-natively-executable computer program file to the service provider computer, in response to determining that the installer program was installed and one or more of the bundled external software offers was selected or installed.

In another feature, the method further comprises the installer program sending a request for the non-natively-executable computer program to the first computer, in response to determining that the installer program was installed and one or more of the bundled external software offers was selected or installed. Selecting or installing one or more of the bundled external software offers is not required in all embodiments, and in some embodiments the end user may decline installing all of the bundled external software offers. In various embodiments, in response to receiving a download request, the installer program checks which programs are already installed on the end user's computer. In an embodiment, the installer program is configured to confirm which offers were successfully installed.

In an embodiment, a data processing system comprises a service provider computer configured to couple to one or more data networks; one or more non-transitory computer-readable data storage media coupled to the service provider computer and storing one or more sequences of program instructions which, when executed by the service provider computer, cause performing: receiving from the website a copy of a non-natively-executable computer program file; generating and distributing a script code that is configured, when activated, to cause downloading of a dynamically generated natively executable installer program from the service provider computer; receiving from an end user computer, a request based upon the script code, and in response to the request, the service provider computer generating a natively executable installer program that comprises some or all of the non-natively-executable computer program and one or more bundled external software offers, and providing the installer program to the end user computer; receiving, from the installer program, a request for the non-natively-executable computer program file; providing the non-natively-computer program file from the service provider computer to the end user computer.

For purposes of illustrating a clear example, certain parts of this disclosure refer to computer games; however, embodiments may be used in connection with assets that implement any kind of computer function, not just games. Further, while some examples are described in the context of FLASH or SWF files, any form of content or process that may be implemented using other forms of non-natively executable files, including but not limited to FLASH or SWF files, HTML5 files, JAVASCRIPT files, APPLE QUICKTIME files, etc. may be used in various embodiments.

As an overview of certain embodiments, FIG. 1A illustrates processes of packaging non-natively-executable assets with bundled external software offers in two views appropriate for website owner/operators and content owner/operators, respectively. As indicated in blocks 10, 18, in general, view A of FIG. 1A is appropriate for those who own, operate or are associated with websites, including but not limited to gaming websites that deliver games developed internally or by others, and view B is appropriate for those who are content owner/operators who deliver completed programs, including but not limited to games, to others for delivery to end users. Thus, a non-limiting example of a content owner/operator is a game developer.

Referring first to view A of FIG. 1A, in an embodiment, at operation 12, a website owner/operator signs up with a service provider using a service application and registers the website by providing basic data describing the website. At operation 14, the service application customizes and generates website script code for end users to download a natively executable installer package that includes a non-natively-executable program. Optionally, the installer package also may include a player, or other support software to permit local execution of the non-natively-executable program, and/or one or more external software offers. At operation 15, end users are able to install and run the non-natively-executable program locally, by executing the installer package and, in some cases, using the player or other support software. At operation 16, as end users download and use the installer package to use the non-natively-executable program, which may be bundled with the external software offers, the website owner/operator may receive compensation via an ad network or other compensation mechanism related to the external software offers.

In general, using the process of view A, in one embodiment, a website owner/operator is able to obtain script code that permits end user computers to download a copy of a game or other asset that is otherwise executable only online, as in the case of a FLASH or SWF file or game, via natively executable installer and that may optionally include a player or other support software and/or one or more external software offers. In one example implementation, one or more of the external software offers is a program such as a toolbar or other executable program that is associated with delivery of advertisements. In such an example, the asset may become monetized because the service provider, which may be an ad network, provides compensation to the website owner/operator as end users install the installer package with the external software offers. Because the external software offers provide a new way for the service provider to deliver ads to end users that have been located via the website, it is appropriate for the service provider to compensate the website owner/operator for providing the ad audience represented by the users of the website who downloaded the installer. The script code generated at operation 14 may enable the ad network to control downloading of the installer and to track downloads and installations for purposes of selecting and delivering ads to the end user computer, revenue accounting and compensation.

Referring now to view B of FIG. 1A, in an embodiment, at operation 20 a content owner/operator signs up with the service provider and uploads a copy of a game or other program to the service provider. At operation 22, the service application customizes and generates a download link to be integrated into the game or other program, for end users to download a natively-executable installer package that includes a non-natively-executable game or other program and one or more external software offers. The download link identifies a unique file location on the service provider's systems from which the installer package may be obtained, and may comprise a URL identifier, a hash value for authentication purposes, and a unique asset identifier. Thereafter, the content owner/operator provides the download link to the distribution network of the content owner/operator, which typically comprises, but is not limited to, third party websites or owned/operated websites that are configured to promote the link. At operation 23, end users are able to install and run the non-natively-executable program locally, by executing the installer package and, in some cases, using the player or other support software. At operation 24, as end users download and use the installer package to use the non-natively-executable program, which may be enhanced or bundled with the external software offers, the content owner/operator may receive compensation via an ad network or other compensation mechanism related to the external software offers.

In general, using the process of view B, a content owner/operator is able to obtain a download link that permits end user computers to download a copy of a game or other asset that is otherwise executable only online, as in the case of a FLASH or SWF file or game, via natively executable installer that may include a player or other support software and/or one or more external software offers. The asset may become monetized because the service provider, which may be an ad network, provides compensation to the content owner/operator as end users install the installer package with the external software offers. Because the external software offers provide a new way for the service provider to deliver ads to end users that have been located via the distribution network of the content owner/operator, it is appropriate for the service provider to compensate the content owner/operator for providing the ad audience represented by the users of the game or other content who downloaded the installer. The code generated at operation 22 enables the ad network to control downloading of the installer and to track downloads and installations for purposes of selecting and delivering ads to the end user computer, revenue accounting and compensation.

Processes for Content Owner/Operators

FIG. 1B illustrates a computer system arrangement useful in transforming browser-executable code into locally executable files and focusing on operations of a content owner/operator, for example, a computer game developer. Numbered arrows in FIG. 1B, FIG. 2 may represent electronic messages that are communicated between computers using protocols such as HTTP.

In an embodiment, a content owner/operator 102 having a computer may upload one or more non-natively-executable assets to a code processing computer 104, as arrow 1 indicates. In this context, "asset" typically refers to one or more non-natively-executable files, for example, *.SWF files representing FLASH code and implementing a computer game or other functionality, HTML5 files, JAVASCRIPT files, APPLE QUICKTIME files, or any other program or file that normally requires a player or other support software for playing, rendering or use on an end-user computer. The uploading step of arrow 1 may occur in the context of a registration process that is made available through a service application 105 hosted at one or more of code processing computer 104 and file server computer 112 that the content owner/operator 102 accesses using a browser or other means. For example, as further described herein, the code processing computer 104 may host a dashboard, portal or other interface to which the content owner/operator 102 may log in, provide profile data that is subject to review and approval by administrator 106, and then log in after approval to enter or edit information about assets to be registered. Initial registration or post-approval operations may include terms and conditions of an agreement between the content owner/operator and the service provider that establishes contract terms including revenue share terms. The particular steps involved in registering and approval are not critical, and may vary in different implementations.

Code processing computer 104 cooperates with a file server computer 112 to perform certain operations herein and may be associated with a service provider 114 as further described herein to deliver the service application 105. In an embodiment, one or more of the code processing computer 104 and file server computer 112 host or are coupled to a database server that implements a relational database comprising tables that store and maintain data pertaining to games or other assets, websites, and accounts of content owner/operators. Service application 105 controls or has access to the database.

The assets are received and stored at the code processing computer 104. An administrator 106, using a separate computer or by direct access to the code processing computer 104, may review the assets at arrow 2. At arrow 3, the administrator 106 may approve the assets and accordingly signal the code processing computer 104 to generate a download link. At operation 4, code processing computer 104 generates a download link for assets that are approved. As a result, at arrow 5, the download link becomes available at code processing computer 104 for the content owner/operator 102 to obtain via a dashboard or other interface to a service application running at the code processing computer.

In an embodiment, at arrow 6 the content owner/operator 102 provides the download link to one or more distribution computers 108 that are owned, operated or controlled by the content owner/operator, or affiliates or other third parties, and that are associated with delivery of the game or other asset to end users. For example, the one or more distribution computers 108 may be coupled in a public network and accessible to the end user computer 110 and file server computer 112, and may host or deliver multiple games or other assets, alone or in conjunction with other content or services. Each distribution computer 108 typically serves HTML pages that offer games or other assets, and the download link may be integrated into those pages. Additionally or alternatively, the download link may be integrated into web pages that the content owner/operator 102 directly serves or hosts. Further, the download link may be compiled into a game in a non-natively-executable format that the content owner/operator 102 already distributes in the form of a new button, add, offer, etc. In any of these embodiments, the download link may be associated with a single version of a game or with a different version of a game, for example, a version with an enhanced level package or other features that are provided to the end user as an incentive to use a version that includes the external software bundles.

The download link may be a uniform resource locator (URL) or other value indicating a networked computer location for a copy of the approved assets which, when activated, permits downloading a copy of the approved assets packaged in a manner that permits native execution on the end user computer, as further described herein. A review step at arrow 2 enables the administrator 106 to exercise control over the assets by making available, for native execution on the end user computer, only functionality that is acceptable to the operator of the code processing computer 104 and other aspects of the system. Further, the steps of arrows 2 and 3 in combination permit the administrator 106 to balance load on the computers by selecting a particular best downloading location for the approved assets.

Figure 2:
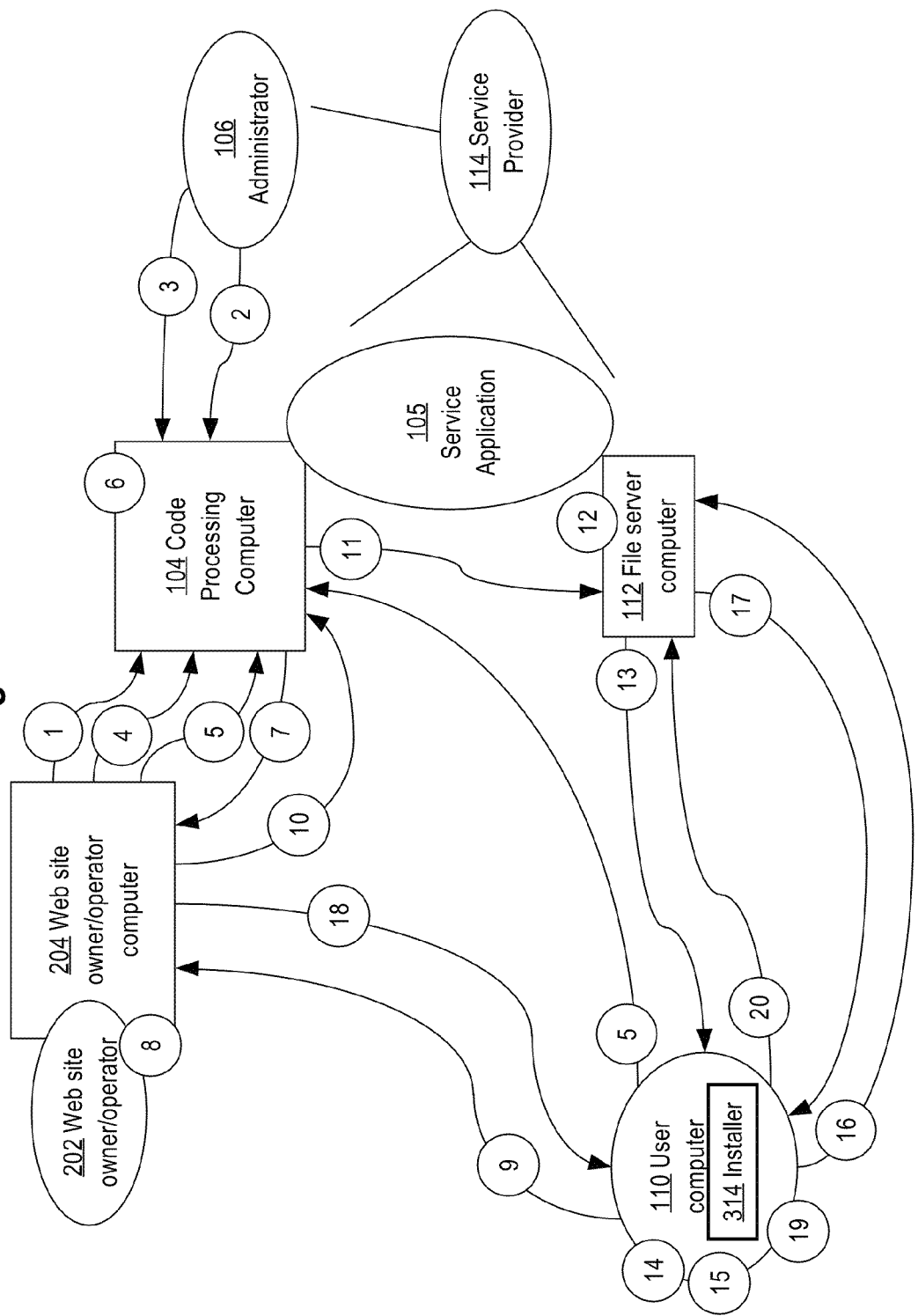
FIG. 2 illustrates a computer system arrangement useful in transforming non-natively-executable programs into natively executable programs and focusing on example operations of a website owner/operator.

In an embodiment, the code processing computer 104 is coupled to a file server computer 112 that may serve as a persistent repository of approved assets and packaged assets for downloading by end user computer 110. Typically the code processing computer 104, administrator 106, and file server computer 112 are associated with a service provider 114 such as an advertising network and the content owner/operator 102 and end user computer 110 are associated with separate parties. One or more of the code processing computer 104 and the file server computer 112 may execute an HTTP server, server-side web application programs, and associated supporting software that implement a service for adding data describing web sites relating to assets, editing the data relating to the web sites, adding data describing games or other assets for a particular web site, editing the data relating to the games, and other functions, as further described herein for FIG. 4 and related views. Additionally or alternatively, one or more application servers, database servers, presentation servers, or other functional units may be implemented in the computer systems shown in FIG. 1B, FIG. 2 and the particular system architectures shown in FIG. 1B, FIG. 2 are intended merely as examples.

After the foregoing preparatory steps, operations with an end user computer 110 proceeds as follows. Typically the end user uses a browser at the end user computer 110 to browse to an HTML page of a website that provides a non-natively-executable computer program, such as a FLASH game for online play via a FLASH player configured in the browser. The HTML page offers the end user the opportunity to play the FLASH game in conventional manner by streaming the contents of the FLASH file from the host website to the FLASH player in the browser. Additionally, because the content owner/operator registered with the service provider 114, the HTML page includes a link labeled DOWNLOAD GAME NOW, or other text indicating that a download is available to permit native execution on the end-user computer.

In the context of FIG. 1B, in an embodiment, end user computer 110 sends a request at arrow 7 to the code processing computer 104 to obtain an installer for a particular asset, such as a game. Typically the request of arrow 7 results from the end user computer 110 browsing to a website that hosts a game page and clicking on a link or URL that indicates the capability to download the game.

In response, at arrow 8, the code processing computer 104 transmits a corresponding request to the file server computer 112. In response, at arrow 9, the file server computer 112 returns an installer program 314 to the end user computer 110. As further described herein in connection with FIG. 3, the installer program 314 is natively executable; for example, for computers using the MICROSOFT WINDOWS operating system, the installer program is an EXE file. The installer program may be given, by the service provider 114, a name defined as the game name previously provided by the content owner/operator concatenated with "SETUP.EXE," to provide a familiar naming convention that gives the end user confidence that the downloaded file is correct. In an embodiment, as further described herein, the installer program may be configured as a combination of installation software, one or more offer screens referencing the approved assets and/or one or more additional bundles of external software offers, such as content or executable code having form or content determined by one or more of the administrator 106 and code processing computer 104. The installer program may also contain references to a player or other support software to permit use of the game or other asset on the end user computer, to enable later downloading these assets in connection with downloading and installing a game, other content or asset, and/or the external software offers after approval by the end user. In one embodiment, the bundles of external software offers may comprise one or more advertisements or advertising tools, such as toolbars for installation in the end user computer 110. The installer program may be created as an EXE file in real time by the code processing computer 104 in response to receiving the request of arrow 7. In other words, there is no requirement for the service provider 114 to create and store a large number of EXE files; they can be created on demand as end user computers 110 submit requests.

The installer program then executes at the end user computer 110. At operation 10, the end user computer 110 views and normally accepts an offer to install and use the game or other asset. At operation 11, the end user views and typically accepts and selects installing zero or one or more bundled external software offers that are configured with the installer program. At arrow 12, the installer 314 requests the file server computer 112 to provide one or more files corresponding to the game or other asset and all the accepted external software offers, and at arrow 13 the specified files are returned to the installer 314. The specified files are then installed at the end user computer 110 at operation 14, and at arrow 15, the installer 314 reports success or failure with respect to all installations back to the file server computer 112.

Installation, at this stage, may include presenting one or more toolbars or other ad-supported tools to the end user computer 110 and obtaining end user input to confirm that installation of a particular one or more of the toolbars or tools is acceptable. In effect the end user may select at least one ad-supported element from the bundles and approve its installation. Other embodiments may be implemented using bundles that are unrelated to advertising. Further, the installer program may issue calls to external bundling partner computers to obtain executables, graphics, or other elements that form elements of the external software offers. Additionally or alternatively, all executables, graphics or other elements may be integrated into the installer program. An arbitrary complex message dialog between the installer program and one or more third party bundling partners may be used. Calls or messages to third party bundling partners may be issued based upon the configuration of the end user computer 110 or particular software, such as a particular browser type, that is present on the end user computer. The particular mechanisms for installing the bundles are not critical and different or additional steps may be used.

In an embodiment, the request at arrow 12 from the installer program 314 to the file server computer 112 may be encoded or formatted in a manner that is not spoofable, or that is capable of authentication. In other words, the request may be formatted so that only the installer program is capable of delivering the request with the correct format or to the correct location at the file server computer 112 to obtain the asset.

Relatively concurrently, in one embodiment the installation process includes installing a FLASH player plug-in or other support software on the end user computer 110 to ensure that the non-natively-executable asset referenced in the installer program can be used. The files returned at arrow 13 may be in the original non-natively-executable format, such as FLASH or SWF, and may execute in a browser hosted at the end user computer 110 without a then-currently live network connection by installing the player or other support software.

The installer program is configured so that using the external software offers, viewing advertisements, or installing or using the external software offers or advertising tools, is required for the end user computer 110 to access, use or install the approved assets. In one sense, if the end user computer 110 seeks to obtain the convenience of having a game program (for example) packaged in locally executable format such as rather than accessing the game program in FLASH or SWF format over a network connection, then the end user computer 110 is required to view advertisements or install and use one or more external software offers or advertising tools. However, the general techniques described herein are applicable to contexts other than gaming and other than advertising, and may be used in any case in which it is convenient or useful to deliver FLASH programs, HTML5 code, JAVASCRIPT, QUICKTIME, or other browser-executable code in a locally executable format such as EXE in combination with one or more other content items or executable items.

In some embodiments, a successful installation of the asset and the selected bundles causes the installer program to send one or more statistics values to the file server computer 112, code processing computer 104, or another computer associated with operating a service as indicated herein. For example, the installer program may send an update indicating that another instance of the asset was obtained and installed, or report which bundles were installed. The specific values or indications that are reported for statistical or accounting purposes may vary among implementations and are not critical.

In some embodiments, the file server computer 112 may generate and store one or more reports relating to the statistical values. For example, the system herein may be configured so that a payment is arranged between a service provider 114 and the content owner/operator 102, as a reward for the end user computer 110 successfully installing the one or more bundles of external software offers, content, programs, advertisements, or advertising tools. Funds for the payment may be obtained in whole or in part from an advertiser whose advertisements are placed in the bundles or in the advertising tools. Thus, the service provider 114 may act as a technology-based ad network to obtain advertisements from agencies, content owners or other advertisers, to place the ads in the bundles, and to work with the content owner/operator 102 or other asset providers to deliver the installer with the bundles to end users of the content owner/operator 102. As a result, viewers of the advertisements are effectively delivered to the advertisers in new ways, and consumers or end users associated with the end user computer 110 obtain the benefit of locally executable, entertaining games or other assets.

Further, a benefit of the approach of this section is that by hosting copies of the non-natively-executable computer programs that are ultimately distributed to end user computers 110, the service provider 114 maintains control over the content of the files that are delivered. For example, the service provider 114 can have confidence that a particular game SWF file has not been altered or modified between the time of registration in the service and the time of delivery to an end user computer 110.

In an embodiment, the service application 105 is configured to receive data from a content owner/operator 102 specifying whether a particular game or other asset is sharable with others. For example, a content owner/operator 102 may be willing to permit a particular game to be distributed by the service provider 114 to others who are not in the content owner/operator's network of distribution computers 108, provided that the content owner/operator 102 retains ownership of the particular game and may receive a revenue share or other payment or compensation when the particular game is used to facilitate delivery of external software offers to an end user computer via a third party. In an embodiment, the service application 105 may include a checkbox or other widget that permits the content owner/operator 102 to specify whether a particular game is approved for sharing with others. If so, then code processing computer 104 or file server computer 112 may update a catalog or other database table to indicate that the particular game is sharable. In this manner the service provider 114 can develop a large, sharable catalog of games from various developers and act as a content distributor to identify, on its own, one or more distribution computers 108 or other distribution mechanisms at which to place links to the game that invoke the installation program in the same manner described herein. Consequently, by authorizing sharing the game or other asset, content owner/operator 102 may be able to greatly expand its distribution scope for a particular game or other asset and increase the revenue generated from that game or asset.

Processes for Website Owners or Operators

FIG. 2 illustrates a computer system arrangement useful in transforming non-natively-executable code into natively executable files and focusing on example operations of a website owner/operator. In one embodiment, a web site owner/operator 202 is coupled to a web site owner/operator computer 204. Typically the web site owner/operator provides a gaming web site that offers one or more games in FLASH or SWF format for play by end users who connect to the games using a browser, but the web site may host other non-natively-executable programs that address functions other than games and embodiments are not limited to gaming.

In an embodiment, at arrow 1 the web site owner/operator computer 204 registers the web site with the code processing computer 104 using a service application provided by the service provider 114. Registration may occur through a structured data entry process implemented via a service application in which the web site owner/operator enters data using online web forms that are served from the code processing computer 104, as further described herein in later sections.

At arrow 2, the administrator 106 reviews the website and at arrow 3, the administrator 106 may approve the web site. Approval may involve reviewing substantive content of the website or its games, checking compliance of terms of use, or other steps. The effect of registration is to populate data identifying the web site 202 and certain installation-related functions into script code, as further discussed herein. Thus, in the scenario of FIG. 2, the FLASH or SWF file representing a non-natively executable asset or other game is not stored at or hosted by the service provider 114, but is hosted at the web site owner/operator 202 and obtained on demand at the time that an installer program is delivered to an end user computer 110.

At arrow 4, the web site owner owner/operator computer 204 may customize one or more options relating to delivery of an asset of the web site owner/operator 202 when the asset is packaged with an installer program as a natively executable program in later steps. In other words, arrow 4 permits the web site owner/operator computer 204 to configure or specify optional values associated with the packaging that ultimately affect how the non-natively-executable program is presented using the installer in subsequent steps and/or how the end user may interact with the program.

At arrow 5, the web site owner/operator computer 204 sends a request to obtain script code for installation into the web site 202. In an embodiment, the request is to obtain JAVASCRIPT code, defined by the service provider 114, that the web site owner/operator computer 204 can implement in HTML pages that the website owner/operator 202 delivers to end user computer 110 in response to browsing operations. For example, in an embodiment, generating HTML pages that invoke the script code results in a browser at end user computer 110 displaying an ad unit of the web site owner/operator 202 for the game or other asset. When the ad unit is activated, as further described, the end user computer 110 may obtain the asset in a package with a natively executable installer and optionally a player or other support software and/or one or more bundles.

In an embodiment, the script code governs aspects of game delivery and display such as look and feel of ad units or external software offers. Thus, by requiring the web site owner/operator 202 to receive and install the script code as a condition of registration in the service, the service provider 114 can control the form of presentation of ad units or external software offers and the appearance of installation-related tasks at the end user computer 110.

In response, at operation 6 the code processing computer 104 automatically generates a script code. At arrow 7, the code processing computer 104 returns the script code to the web site owner/operator computer 204. At operation 8, the website owner/operator 202 installs the script code on the web site owner/operator computer 204. Installation may include modifying the JAVASCRIPT code file to include a specific download link URL that contains the file location of a SWF file for a particular non-natively-executable program available at the website.

End user computer 110, file server computer 112, and web site owner/operator computer 204 then interact to facilitate delivering the asset, optionally with a player or other support software and/or bundled external offers, to the end user computer 110 in the following example operations. At arrow 9, a user of the end user computer 110 browses to the web site and activates the ad unit, indicating a request to download a copy of a non-natively-executable game or other asset to the end user computer 110 for local use or execution. At arrow 10, activating the ad unit causes the script code at web site owner/operator computer 204 to transmit a request to the code processing computer 104 to retrieve one or more parameter values. In response, at arrow 11, the code processing computer 104 transmits the request to file server computer 112. In response, at operation 12, file server computer 112 generates a natively executable installer program. At arrow 13, the file server computer 112 returns the natively executable installer program 314 to the end user computer 110. The installer 314 comprises installation software, the non-natively-executable program, and optionally a player or other support software and/or one or more bundles of external software offers or other content, programs or assets such as advertisements or advertising tools, as further described herein. One benefit of this approach is that the natively executable installer program is generated dynamically at the time of a request by the end user computer 110, which enables the file server computer 112 to bundle new, different or current ads or ad tools at the time that the installer program is generated, providing a dynamic approach that enables the latest offers or ads to be provided to the end user computer 110. Further, the approach enables delivery of a non-natively-executable computer program to an end user computer 110 packaged in a manner that permits native execution of the installer and use of the program.

The end user computer 110 executes or runs the installer 314. At operation 14, typically the end user views and accepts a game offer at the end user computer 110, and at operation 15, the end user views and accepts zero or one or more of the bundled external software offers. At arrow 16, in response to at least one of the acceptance actions, the installer 314 requests the file server computer 112 to provide one or more files corresponding to the accepted game offer and the accepted bundled external software offers.

At arrow 17, the file server computer 112 returns the one or more files corresponding to the accepted bundled external software offers. At arrow 18, a file corresponding to the game or other asset is obtained from the website owner/operator computer 204 and is delivered to the end user computer 110. The specified files are then installed at the end user computer 110 at operation 19. At arrow 20, the installer 314 reports to the file server computer 112 a success or failure indication for each of the installations to be performed based on the end user's acceptance actions.

Installation of the installer 314 prior to operation 14 may involve presenting a game image and other information about the game so that the end user is aware that the downloading operation is succeeding. Installation at operations/arrows 14 through 20 may include installing the one or more bundles of external software offers or other content, programs or assets, such as ads or ad tools, in the manner previously described for FIG. 1 and may include causing displays of secondary or tertiary offers. Any one or more of operations/arrows 14 through 20 also may include transmitting reports of accounting or statistical data to the file server computer 112 directly or via the web site 202.

Installer Packages

Figure 3:
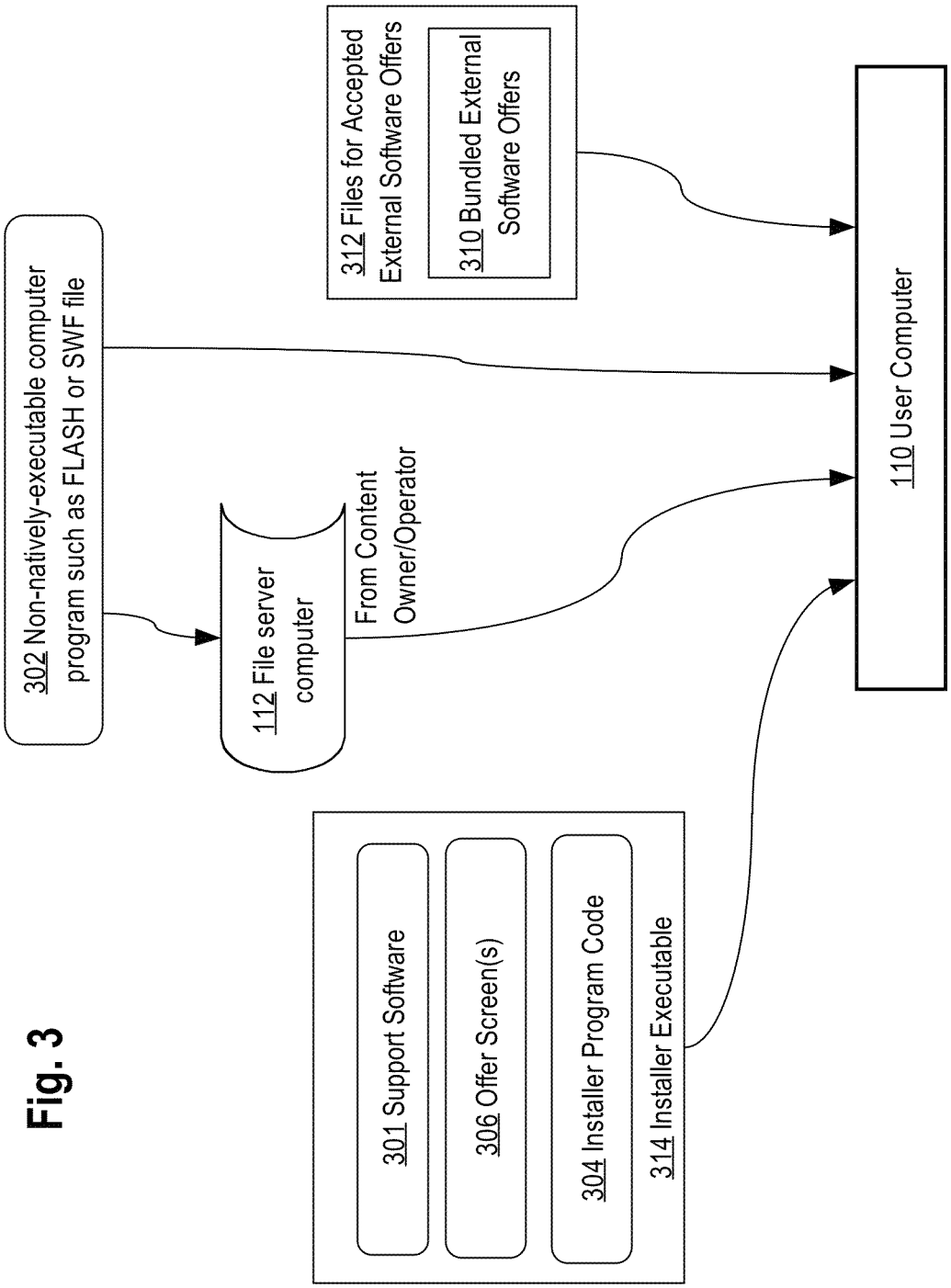
FIG. 3 illustrates an example embodiment of an installer executable.

In an embodiment, as previously described for FIG. 1B, FIG. 2, an installer program comprises installer program code, and one or more offer screens associated with the external software offers, packaged together in the form of an executable file. FIG. 3 illustrates an example embodiment of forming an installer executable and its contents, and delivering related files. Two operational cases are possible; in the first case, a content owner/operator uploads a non-natively-executable computer program file 302 for a game or other content or asset to the file server computer 112 before the file is obtained by the end user computer 110, and in the second case a website owner/operator uses other means to make available the non-natively-executable computer program file to the user computer. Examples of the non-natively-executable computer program 302 include a FLASH or SWF file, HTML5 file, JAVASCRIPT, QUICKTIME, etc.

In an embodiment, the service provider provides installer program code 304 and optionally one or more offer screens 306 that relate to external software offers in the installer executable 314, which is provided in the manner previously described for FIG. 1B, FIG. 2. Each of the offer screens 306 may be associated with stored files 312, bundled external software offers 310, such as a toolbar, that is installable into a target end user computer 110 to deliver advertisements in a main window display of the computer or in response to invocation of various functions In either the case of a content owner/operator or website owner/operator, the natively executable installer executable 314 also may receive a desktop icon, game image, dimension data, and other data necessary or appropriate to enable proper instantiation of windows or computing resources such as memory on the end user computer 110 at the time a game is played or when a non-game asset is executed.

In an embodiment, the processes previously described or other configuration operations may be used to package the foregoing elements in an installer executable 314. In one embodiment, installer executable 314 is an EXE file for native execution and use on WINDOWS PC systems. In other words, the installer executable 314 is directly executable by the operating system of the end user computer 110 and does not require prior invocation of a different application program to open and run. In some embodiments, the installer program code 304 is configured to cause installation of the bundles in the end user computer 110 and to make appropriate system modifications, such as changes to registry keys, to permit use of the files 312 associated with offer screens 306 in a manner that is integrated with the operating system or one or more previously installed applications of the end user computer. Further, the installer executable 314 may reference and, upon acceptance of an associated offer for a game or other content or asset, cause downloading support software 301 for execution on the end user computer 110, to ensure that the end user computer is capable of executing the non-natively-executable computer program file 302. In an embodiment, the support software 301 is a FLASH player that is implemented using C## code invoking MICROSOFT DOT NET architecture elements to permit instantiation of IFRAMEs in a compatible browser on the end user computer 110 at the time of execution.

In some embodiments, the installer program is configured to cause invocation or execution of the non-natively-executable computer program file 302 on the end user computer 110, either directly using native parsing and rendering services or by causing invocation of the support software 301, or a browser application program on the end user computer that is capable of loading and executing, rendering or playing the non-natively-executable computer program file. Execution may comprise invoking browser functions that create an IFRAME in a browser display on the end user computer 110 in which a game is displayed and ran. As a result, an end user associated with the end user computer 110 obtains the convenience of having a locally stored and executable copy of an asset such as a game or other program that is originally not natively executable or that otherwise would require an active connection to a public network for use. Consequently, it may be possible to use the non-natively-executable asset without prior installation of a player, browser plug-in or other support software, and/or during a time when a network connection is not available, such as during a private or commercial aircraft flight, during travel in a car that is not within range of a wireless network, or in any other circumstance in which network connectivity is unavailable. Further, the files 312 may be delivered and installed automatically at the time that the installer executable 314 runs in the manner previously described, providing new ways for advertisers or ad networks to deliver ads to end user computers.

Graphical User Interface Example for Content Owner/Operator and Website Owner/Operator In an embodiment, a content owner/operator performs the asset uploading step of FIG. 1B, arrow 1, and a website owner performs the website registration process of FIG. 2, arrow 1, after or during a process of registration with the service provider 114 that is associated with code processing computer 104 and file server computer 112.

Figure 9:
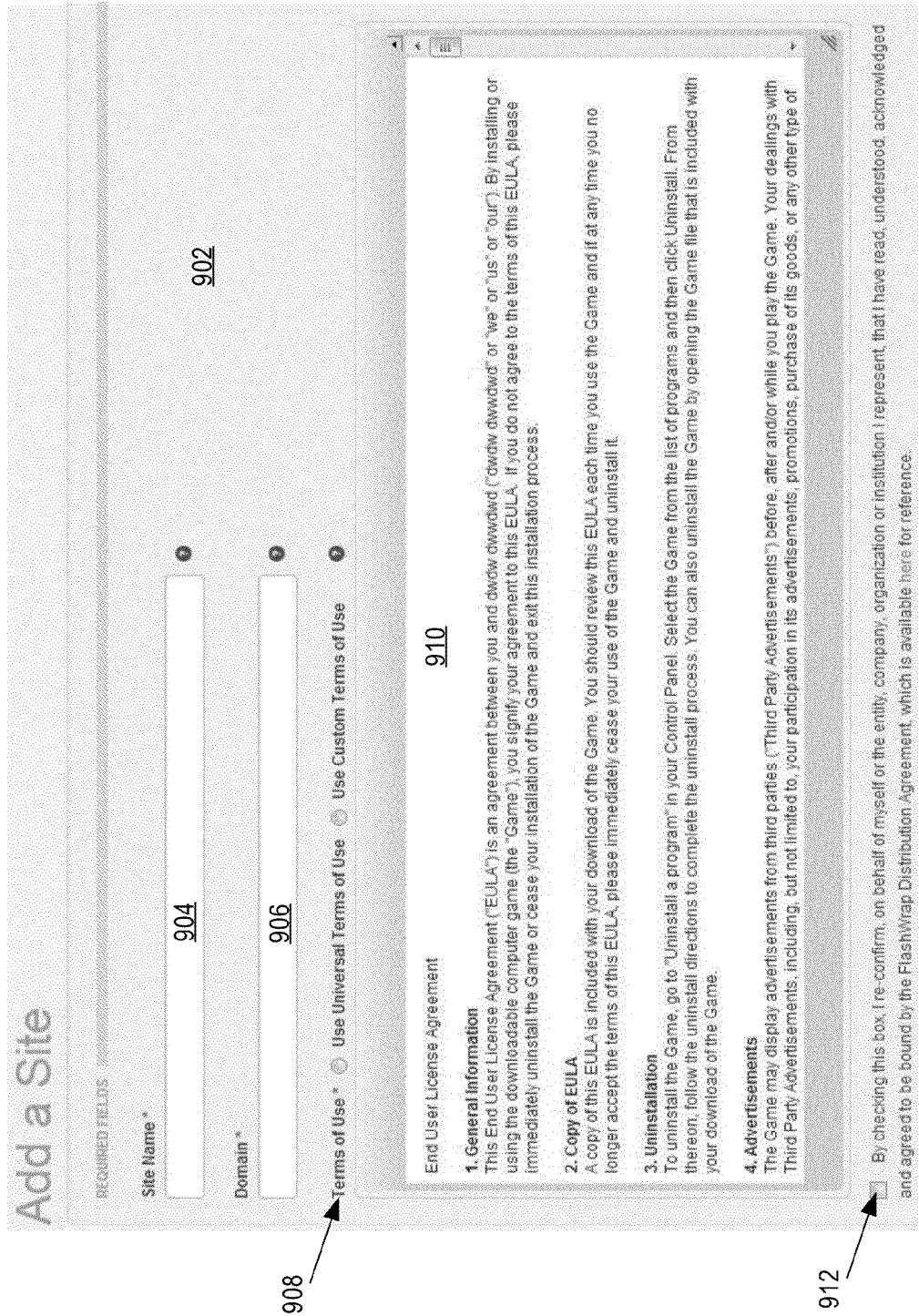
FIG. 9 illustrates a screen display that the service application may generate for adding a website.

FIG. 9 illustrates a screen display that the service application 105 may generate for adding a website. In an embodiment, registration process comprises using a browser on a computer to provide login credentials to access the service application. In response, the web site owner/operator receives an HTML form such as the Add a Site screen 902 of FIG. 9. In an embodiment, screen 902 comprises a site name field 904 that is configured to accept a text-based name for a website, and a domain name field 906 that is configured to accept a domain name for the site. A Terms of Use widget 908 prompts the website owner/operator to select a form of an end user license agreement 910 for delivery with the asset in the package to the end user.

For example, the service application 105 may provide a set of universal legal terms and conditions of use, as seen in panel 910, that the web site owner/operator can specify for use with any game or asset, and the service application also may permit the web site owner/operator to specify the use of custom terms of service. The universal terms of use are structured as a template file consisting of text and substitution locations in which asset-specific data may be inserted automatically. When universal legal terms of use are selected, the service application automatically populates the substitution locations with specific data, such as a contact email address for the website owner/operator. When custom terms of service are specified, the web site owner/operator is required to upload a copy of the text of the terms, which may be subject to review and approval by the administrator 106. This option enables the web site owner/operator to specify its own legal terms of use of its software to end users, subject to potential delay as the administrator 106 reviews the terms. In an embodiment, a graphical user interface display screen that is configured to receive a selection of universal terms of use or custom terms of use, and to display a corresponding end user license agreement, may have the appearance of FIG. 6 including widget 605 and agreement display 606, as further described herein.

In an embodiment, after adding a site by providing the site name, domain name, and terms of use, the web site owner/operator may edit the values previously provided to change the site name, domain name, and terms of use. Some changes may require re-approval by the administrator 106. Screen 902 also may be configured with a checkbox 912 to indicate agreement to the terms and conditions of an agreement for use of the service provider's services. In an embodiment, another screen display having a form similar to screen 902 may be associated with an editing function that permits retrieving the data previously entered for a particular site and editing the values shown in FIG. 9.

Figure 4:
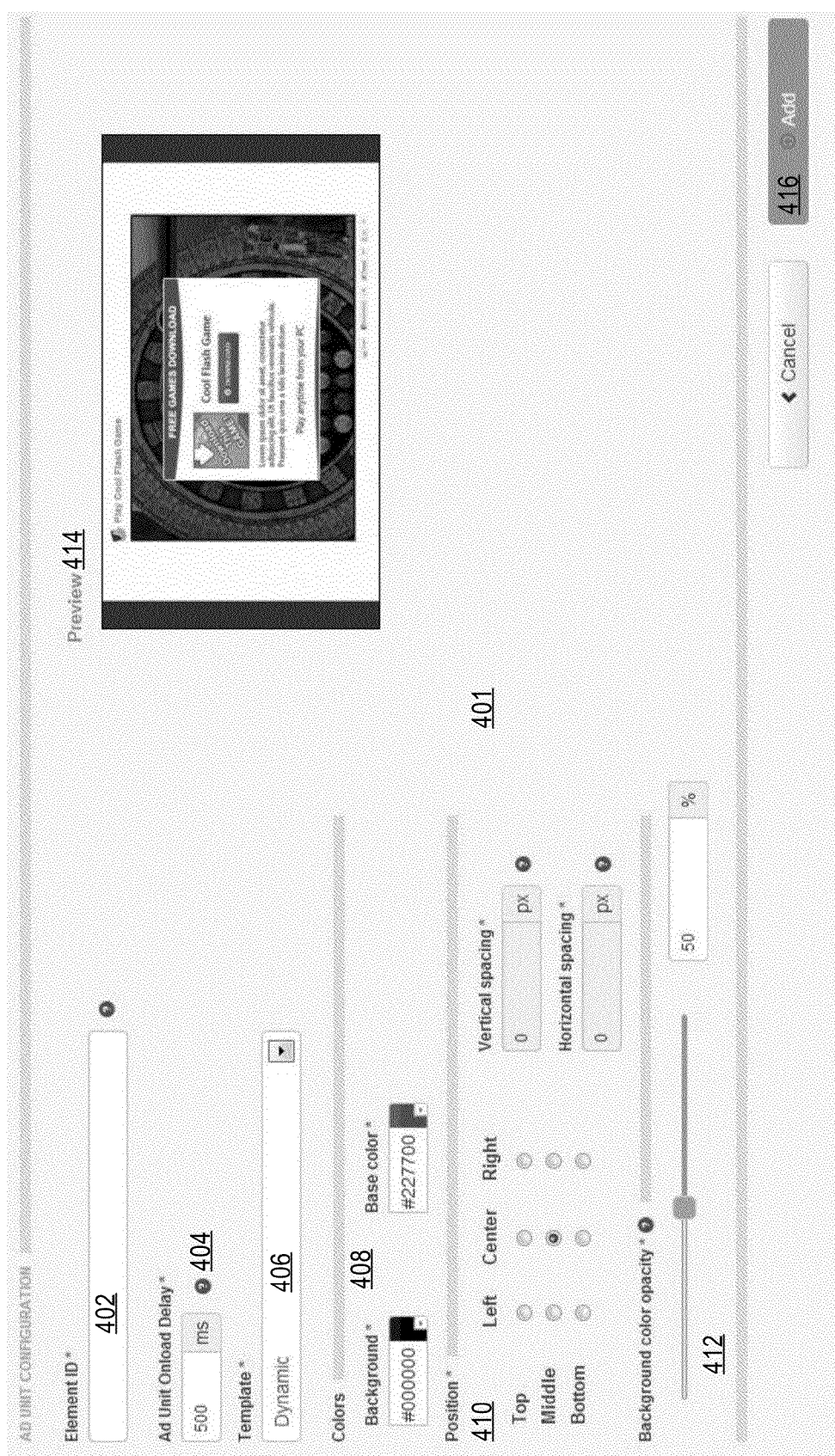
FIG. 4 illustrates a screen display that a service application may generate as part of executing on one or more of the code processing computer and the file server computer for defining an ad unit configuration.

Certain aspects of the user interface are presented to content owner/operators, and other screens are used only for web site owners/operators, as further described. For example, after adding a site, a web site owner/operator may define an ad unit configuration for what promotional images and messages are to be displayed for a particular game, whereas content owner/operators only receive a download link and do not define ad units. FIG. 4 illustrates a screen display that a service application may generate as part of executing on one or more of the code processing computer and the file server computer for defining an ad unit configuration for a website. In an embodiment, the service provider application is configured to generate a screen display 401 comprising an element ID field 402, ad unit onload delay widget 404, template type widget 406, color widget 408, position widget 410, opacity widget 412, preview graphic 414, and Add button 416.

The element ID field 402 is configured to receive input indicating an identifier of a website element that indicates a game play template that is used across the website 202, for example. In response, the script code (e.g., JAVASCRIPT) that the service provider 114 later generates for the website 202 is automatically localized to the element ID to enable serving the ad in association with the correct website element.

The preview graphic 414 consists of an overlay of a game image generated by the SWF or FLASH file or defined separately, an opacity layer, and a download prompt message termed an ad unit herein. In the example of FIG. 4, the game image appears as a background element of the preview graphic 414, and appears in a darkened or blurred format based upon the setting of the opacity widget 412, as further described below. An ad unit is superimposed over the game image and comprises prompt or suggestion language inviting the user to download the game, integrated with a download link denoted DOWNLOAD or with similar text.

The ad unit onload delay widget 404 is configured to receive a selection of a time, typically in milliseconds, to delay displaying of the download prompt message shown in preview graphic 414. The onload delay parameter permits a website that uses video ad prerolls or other display items to run or execute those items before the download offer is displayed, for example.

The template type widget 406 is configured to receive a selection of previously stored data, termed a template that can pre-populate other values in FIG. 4 with standard values that the website owner/operator prefers using or that are provided by the service application as a convenience for users. For example, templates can define standard designs of ad units so that non-technical users can rapidly specify the position and appearance of an ad unit without deep knowledge of the effect of particular parameter values. Further, when a template is set to Dynamic, changes in the colors provided via color widget 408 are propagated to the game image as well as the ad unit, providing a coordinated appearance.

The color widget 408 is configured to receive selections of colors, from a color palette or using numeric values, for a background and base color of the ad unit as shown in the preview 414. In an embodiment, selecting color icons in the color widgets causes the service application to generate and display a color palette that is configured to receive color selections from user input and to update the preview graphic 414 in real time based on the color selections so that the user can view how the color selections will appear when the ad unit is displayed. Thus, the preview graphic 414 updates dynamically to reflect changed color selections as values are entered or selected using color widget 408. Alternatively, hexadecimal values or other numeric values indicating colors may be entered via color widget 408.

The position widget 410 is configured with a plurality of radio buttons and spacing widgets that may receive user input indicating a position within a larger screen display on the user computer at which the ad unit should be displayed. In an embodiment, the position widget includes radio buttons with which the user may specify a general screen position in terms of left, center, or right position in a top, middle, or bottom portion of the screen. Based on the selected position, the service application automatically computes a particular location in terms of pixel coordinates at which to display the ad unit. Further, in an embodiment the position widget 410 accepts positive or negative numeric values for vertical spacing and horizontal spacing to indicate an amount of margin separation that the ad unit should observe in relation to a particular general position.

In an embodiment, the opacity widget 412 is configured as a slider widget with which the user may specify a relative amount of opacity with which to display a background for the ad unit. In the example of FIG. 4, an opacity amount of 50% is selected and therefore a background image in the preview graphic 414 appears with 50% opacity. In an embodiment, changing the position of the slider in the opacity widget 412 results in the service application dynamically updating the preview graphic 414 as the amount of opacity changes, so that the user can see immediately while moving the slider how the changed opacity value will affect the appearance of the ad unit.

In an embodiment, the Add button 416 is configured to cause forming a message from the client computer 204 to the service application that provides all values that were entered using screen display 401. In response, the service application at the service provider is configured to store the record in a database, which may be edited or which will drive the generation of a link for the ad unit and the ultimate display of the ad unit to users.

In one embodiment, in the case of either the processes described herein for use with a content owner/operator or a website owner/operator, the particular offers that appear in bundled external software offers delivered as part of the installation program are determined by the service provider. In some embodiments, FIG. 4 or other screen displays that are configured to receive optional data may be configured to receive data indicating a preferred order for external software offers, or specific external software offers to be included, or other configurations relating to the presentation of external software offers. For example, there may be 10 available offers and the website owner/operator would be able to select 3 offers to present to end user computers 110 at the time of different requests.

A benefit of the data entry approach of FIG. 4 is that a non-technical user can rapidly cause creating relatively complex script code that specifies all the parameter values provided in FIG. 4 to the website for use in causing sophisticated displays of ad units that are specialized and customized in an extensive number of ways.

Figure 5:
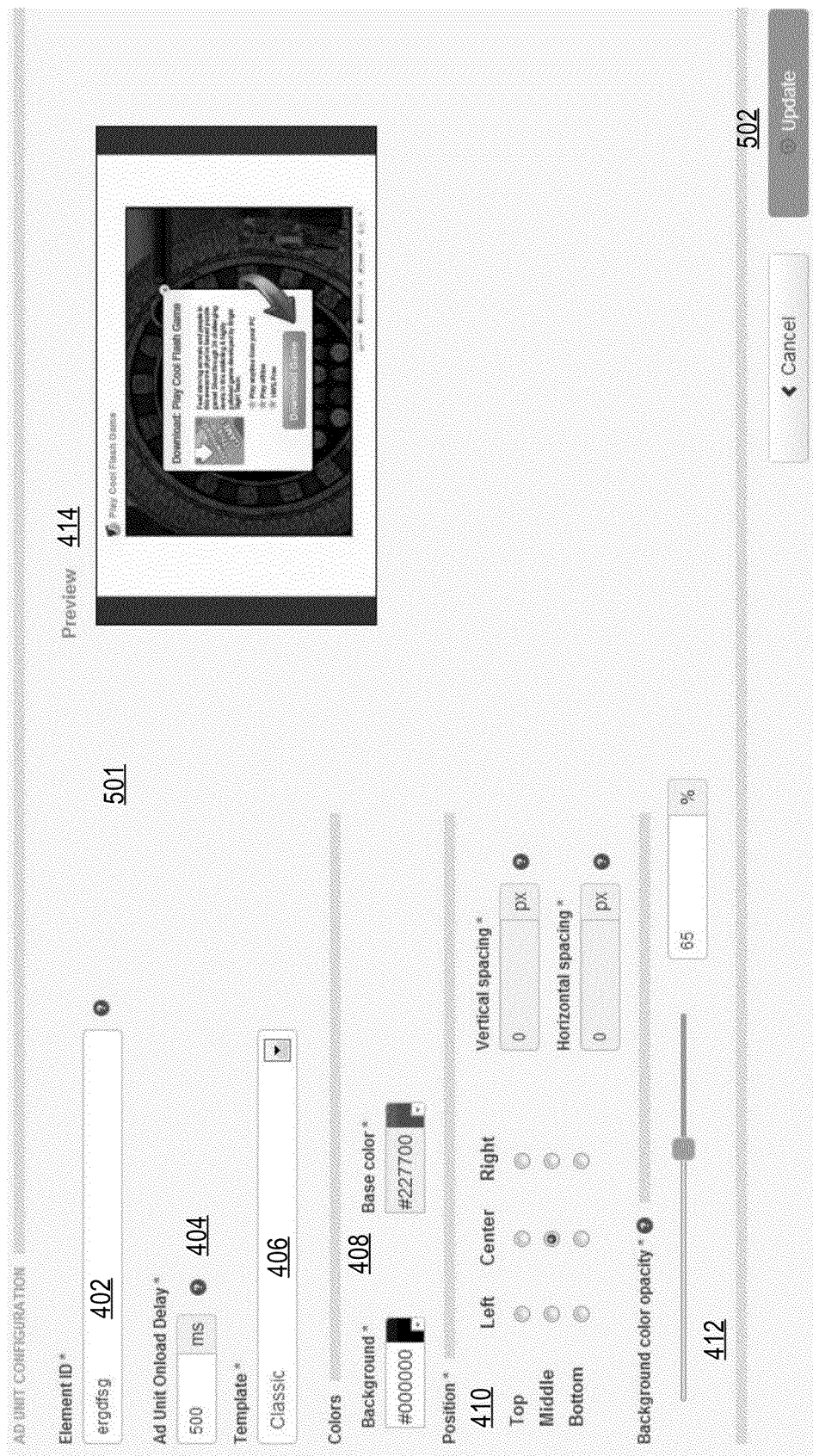
FIG. 5 illustrates a screen display that a service application may generate as part of executing on one or more of the code processing computer and the file server computer for further defining an ad unit configuration.

FIG. 5 illustrates a screen display that may be generated in connection with an editing function for ad units. In an embodiment, screen display 501 of FIG. 5 comprises the elements of FIG. 4 with different values to reflect an example editing operation on an element identified as "ergdfsg" in field 402. As FIG. 5 indicates, the existing values from FIG. 4 may be redisplayed and the website owner/operator may change any of the entered values and update the associated record in the database with the changed values. For example, in FIG. 5 the background color opacity widget 412 has been adjusted to 65% and therefore the background portion of the preview graphic 414 is displayed in a darker form. When the website owner/operator is satisfied with any modifications, the changes may be committed to the database by selecting an Update button 502.

Alternatively, the content owner/operator may provide data specifying details of one or more games or other assets. FIG. 6 illustrates a screen display that the service application may generate for receiving a first set of data that defines a game, for example. In an embodiment, screen display 601 comprises a game name field 602, a category widget 603, a version widget 604, a terms of use widget 605, and a license agreement display 606. In an embodiment, the first set of data received in FIG. 6 is required for a game and other data may be provided optionally, as further described for FIG. 7.

In an embodiment, game name field 602 is configured to receive data specifying a name of a game, and the content owner/operator may specify any desired name. In an embodiment, the category widget 603 is configured as a pull-down menu with which the content owner/operator may select one of a plurality of categories. Example categories for games include Arcade, Adventure, etc., and for assets other than games, any appropriate categories may be used. Category data may assist the content owner/operator in generating reports when the content owner/operator has a large number of games, and may assist the service provider in determining which external software offers to deliver to a particular game. In an embodiment, the version widget 604 is configured with a file browsing widget with which the user may select a particular FLASH or SWF file that implements the game or other asset. In an embodiment, when an Add button is selected after all fields in FIG. 6 are populated, in response, the service application downloads or obtains a copy of the file specified using version widget 604 for storage at the service provider and use in packaging with the installer as previously described.

In an embodiment, the terms of use widget 605 is configured as a plurality of radio buttons with which the user may specify to use a set of universal terms of use or custom terms of use, and the license agreement display 606 reproduces the text of the corresponding terms of use. In response to a content owner/operator specifying to use custom terms of use, the content owner/operator may be prompted using a file open dialog to upload a copy of the custom terms of use for review and approval by the service provider. In some embodiments, a warning message may be displayed indicating that approval is required. In either the case of universal terms or custom terms, selecting an Add/Upload button causes the value selected using widget 605 and the terms of use to be associated with a database record for the game stored at the service provider, and the game record is also associated with a website of the content owner/operator.

FIG. 7 illustrates a screen display that the service application may generate for receiving a second set of data that defines a game, for example. In an embodiment, FIG. 7 is configured to receive optional data that further defines the game that was specified using the display of FIG. 6. In an embodiment, a screen display 702 of FIG. 7 comprises a dimensions widget 704, desktop icon widget 706, image widget 708, and description field 710.

In an embodiment, the dimensions widget 704 is configured to receive width and height values that define a size in pixels of a window in which the game is displayed, to facilitate instantiation on the end user computer 110 of a window of the correct size at the time that the installer is launched and installed and the game is played. Example values are 640×480 pixels. In an embodiment, the desktop icon widget 706 is configured to trigger a file open dialog with which the content owner/operator may specify a location, on the computer of the content owner/operator 102, of a graphical icon that represents the game for displaying in a first screen that the installer program generates and displays on the end user computer 110 at the time of installation, and/or in other displays that promote or offer the game for download. In an embodiment, when the Upload button 712 is selected, in response, the service application uploads a copy of the graphical icon for packaging with the game, installer and bundles as previously described.

In an embodiment, the image widget 708 is configured to trigger a file open dialog with which the content owner/operator may specify a location, on the computer of the content owner/operator 102, of an image that represents the game for displaying in a first screen that the installer program generates and displays on the end user computer 110 at the time of installation, and/or in other displays that promote or offer the game for download. In an embodiment, when the Upload button 712 is selected, in response, the service application uploads a copy of the game image for packaging with the game, installer and bundles as previously described.

In an embodiment, the description field 710 is configured to receive a text description of the game for displaying in a first screen that the installer program generates and displays on the end user computer 110 at the time of installation, and/or in other displays that promote or offer the game for download.

Selecting the Upload button causes transmitting a message to the code processing computer 104 containing the data provided in the screen display 702 for storage in a database record associated with the specified game.

In an embodiment, the data provided via screen display 702 of FIG. 7 may be edited at any time using an editing function provided in the service application. For example, the content owner/operator may use the service application to select an editing function for a particular game and receive a copy of the screen display 702 in which existing data values in the database are displayed for the particular game. The content owner/operator may edit any of the values of fields of FIG. 7 and update the database with new values.

A benefit of this approach, in combination with the dynamic generation of the installer program as previously described, is that changes in the data of FIG. 7 may have immediate effect pending any required approval by service provider on subsequent dynamic generation of the installer program. Stated another way, the next time that the installer program is generated in response to a request of an end user computer 110, any changes just made in the data of FIG. 7 will be reflected in the installer program and its components pending any required approval by service provider. Consequently, for example, a content owner/operator could elect to add a new or different game image, description or desktop icon and the next downloads of the installer program would include that game image and description, and display them during execution of the installer at the end user computer 110, or provide the updated desktop icon for installation on the desktop pending any required approval by service provider.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
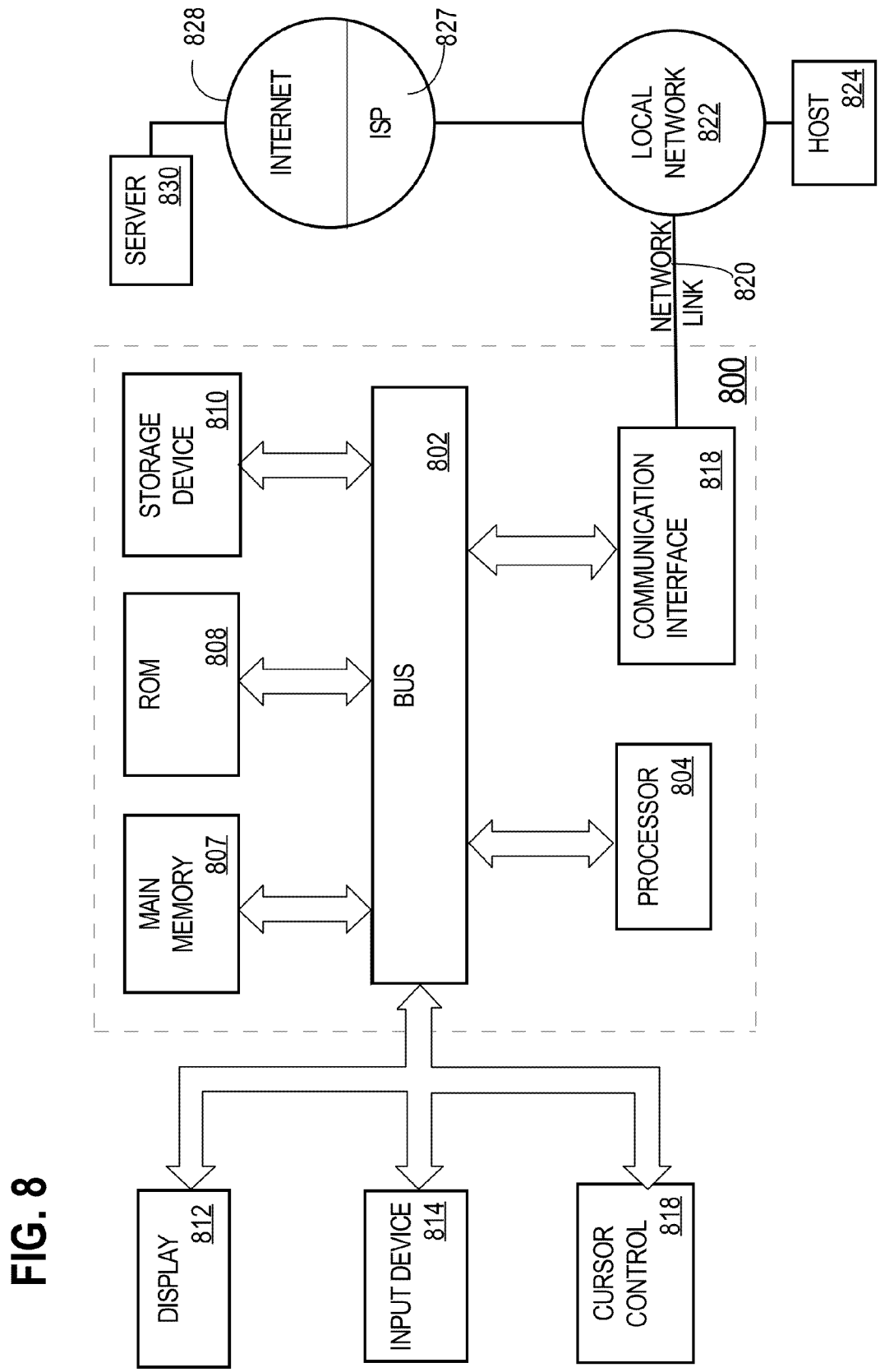
FIG. 8 is a block diagram of a computer system with which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:
   receiving, from a first computer, and storing at a service provider computer, a copy of a non-natively-executable computer program file;
   wherein the non-natively executable computer program file is not an executable and is playable using a player or other supporting software;
   generating and distributing a download link that is configured, when activated, to cause downloading of a dynamically generated natively executable installer program from the service provider computer;
   receiving from an end user computer, a request to download the non-natively-executable computer program file, and in response to the request, the service provider computer generating a natively executable installer program that references the non-natively-executable computer program file, and providing the installer program to the end user computer;
   wherein the natively executable installer program comprises natively executable support software that is configured to play the non-natively executable program file on the end user computer;
   receiving, from the installer program, after installation of the natively executable installer program and the support software on the end user computer, a request for the non-natively-executable computer program file;
   providing the non-natively-executable computer program file from the service provider computer to the end user computer for installation thereon;
   wherein the method is performed by one or more computing devices.

2. The method of claim 1, further comprising generating the natively executable installer program that references the non-natively-executable computer program file and one or more files for one or more bundled external software offers.

3. The method of claim 1, wherein the non-natively-executable computer program file is any of a FLASH file, HTML5 file, JAVASCRIPT file, or APPLE QUICKTIME file, and the support software respectively comprises any corresponding one of a FLASH player, HTML5 browser plug-in parser/renderer, JAVASCRIPT plug-in interpreter, or APPLE QUICKTIME player.

4. The method of claim 2, wherein each of the one or more bundled external software offers comprises a network identifier which when invoked causes downloading an advertising-supported program.

5. The method of claim 4, wherein the advertising-supported program is a toolbar.

6. The method of claim 2, wherein generating the installer program comprises selecting, as the one or more bundled external software offers, a subset of offers from among a set of stored offers based upon one or more stored selection criteria.

7. The method of claim 2, further comprising executing the installer program on the end user computer and generating one or more offers to install the one or more bundled external software offers on the end user computer.

8. The method of claim 1, wherein the request for the non-natively-executable computer program file is formatted to prevent spoofing.

9. The method of claim 1 wherein the non-natively-executable computer program file is any of a FLASH file, SWF file, HTML5 file, JAVASCRIPT file or APPLE QUICKTIME file.

10. The method of claim 2, further comprising the installer program sending a request for the non-natively-executable computer program file to the service provider computer, in response to determining that the installer program was installed and one or more of the bundled external software offers was selected or installed.

11. A data processing method comprising:
    receiving, from a first computer, and storing at a service provider computer, data identifying a website that is capable of hosting a non-natively-executable computer program file;
    wherein the non-natively executable computer program file is not an executable and is playable using a player or other supporting software;
    generating and providing to the first computer a script code that is configured, when activated, to cause displaying of an ad unit;
    receiving from an end user computer, a request to download the non-natively-executable computer program file, and in response to the request, the service provider computer generating a natively executable installer program that references the non-natively executable computer program file, and providing the installer program to the first computer;
    wherein the natively executable installer program comprises natively executable support software that is configured to play the non-natively executable program file on the end user computer;
    receiving at the first computer, from the installer program, after installation of the natively executable installer program and the support software on the end user computer, a request for the non-natively-executable computer program file;

causing providing the non-natively-executable computer program file from the first computer to the end user computer for installation thereon;

wherein the method is performed by one or more computing devices.

12. The method of claim 11, further comprising generating the natively executable installer program that references the non-natively-executable computer program file and one or more files for one or more bundled external software offers.

13. The method of claim 11, wherein the non-natively-executable computer program file is any of a FLASH file, HTML5 file, JAVASCRIPT file, or APPLE QUICKTIME file, and the support software respectively comprises any corresponding one of a FLASH player, HTML5 browser plug-in parser/renderer, JAVASCRIPT plug-in interpreter, or APPLE QUICKTIME player.

14. The method of claim 12, wherein each of the one or more bundled external software offers comprises a network identifier which when invoked causes downloading an advertising-supported program.

15. The method of claim 14, wherein the advertising-supported program is a toolbar.

16. The method of claim 12, wherein generating the natively executable installer program comprises selecting, as the one or more bundled external software offers, a subset of offers from among a set of stored offers based upon one or more stored selection criteria.

17. The method of claim 12, further comprising executing the installer program on the end user computer and generating one or more offers to install the one or more bundled external software offers on the end user computer.

18. The method of claim 11, wherein the request for the browser executable computer program file is formatted to prevent spoofing.

19. The method of claim 11, wherein the non-natively executable computer program file is a FLASH file and the support software is a FLASH player.

20. The method of claim 12, further comprising the installer program sending a request for the non-natively-executable computer program file to the first computer, in response to determining that the installer program was installed and one or more of the bundled external software offers was selected or installed.

21. A data processing system, comprising:
a service provider computer configured to couple to one or more data networks;
one or more non-transitory computer-readable data storage media coupled to the service provider computer and storing one or more sequences of program instructions which, when executed by the service provider computer, cause performing:
receiving, from a first computer, and storing at a service provider computer, a copy of a non-natively-executable computer program file;
wherein the non-natively executable computer program file is not an executable and is playable using a player or other supporting software;
generating and distributing an ad unit or download link that is configured, when activated, to cause downloading of a dynamically generated natively executable installer program from the service provider computer;
receiving from an end user computer, a request to download the non-natively-executable computer program file, and in response to the request, the service provider computer generating a natively executable installer program that comprises references to the non-natively-executable computer program file and one or more bundled external software offers, and providing the installer program to the end user computer;
wherein the natively executable installer program comprises natively executable support software that is configured to play the non-natively executable program file on the end user computer;
receiving, from the installer program, after installation of the natively executable installer program and the support software on the end user computer, a request for the non-natively-executable computer program file;
causing providing the non-natively-executable computer program file from the service provider computer to the end user computer for installation thereon.

22. The system of claim 21, further comprising sequences of instructions which when executed cause generating the natively executable installer program that references the non-natively-executable computer program file and one or more files for one or more bundled external software offers.

23. The system of claim 22 wherein the non-natively-executable computer program file is any of a FLASH file, HTML5 file, JAVASCRIPT file, or APPLE QUICKTIME file, and the support software respectively comprises any corresponding one of a FLASH player, HTML5 browser plug-in parser/renderer, JAVASCRIPT plug-in interpreter, or APPLE QUICKTIME player.

24. The system of claim 22, wherein each of the one or more bundled external software offers comprises a network identifier which when invoked causes downloading an advertising-supported program.

25. The system of claim 22, further comprising sequences of instructions which when executed cause generating the installer program comprises selecting, as the one or more bundled external software offers, a subset of offers from among a set of stored offers based upon one or more stored selection criteria.

26. The system of claim 22, further comprising sequences of instructions which when executed cause executing the installer program on the end user computer and generating one or more offers to install the one or more bundled external software offers on the end user computer.

27. The system of claim 21 wherein the non-natively-executable computer program file is any of a FLASH file, SWF file, HTML5 file, JAVASCRIPT file or APPLE QUICKTIME file.

28. The system of claim 22, further comprising sequences of instructions which when executed cause the installer program sending a request for the non-natively-executable computer program file to the service provider computer, in response to determining that the installer program was installed and one or more of the bundled external software offers was selected or installed.

* * * * *